United States Patent [19]

Hälg et al.

[11] Patent Number: 4,929,483

[45] Date of Patent: May 29, 1990

[54] METHOD OF REINFORCING SHEET METAL PANELS, SHAPED PLASTIC PANELS OR THE LIKE AND A STIFFENING MEMBER USABLE FOR PERFORMING THE METHOD

[75] Inventors: Paul Hälg, Richterswil; Paul Rohrer, Herrliberg, both of Switzerland

[73] Assignee: Gurit-Essex AG, Freienbach, Switzerland

[21] Appl. No.: 205,314

[22] Filed: Jun. 10, 1988

[30] Foreign Application Priority Data

Jun. 19, 1987 [DE] Fed. Rep. of Germany ....... 3720267
Jun. 6, 1988 [CH] Switzerland .......... 2155/88

[51] Int. Cl.$^5$ .............................................. B32B 3/00
[52] U.S. Cl. ........................................ 428/47; 428/78;
428/136; 428/251; 428/285; 428/286; 428/249;
428/413; 428/415; 428/423.1; 428/425.6;
428/44.1; 428/241; 428/243; 428/244; 428/283;
428/433; 428/438; 428/480; 428/200; 428/346;
428/913; 174/DIG. 8
[58] Field of Search ............... 428/47, 78, 136, 251,
428/285, 286, 249, 413, 415, 423.1, 425.6, 411.1,
233, 236, 241, 243, 244, 283, 433, 438, 480, 200,
346, 913; 174/DIG. 8

[56] References Cited

U.S. PATENT DOCUMENTS

| | | | |
|---|---|---|---|
| 2,915,413 | 12/1959 | Ragan et al. | ............................ 117/15 |
| 4,370,369 | 1/1983 | Bonis | ...................... 428/35 |
| 4,444,818 | 4/1984 | Tominaga et al. | ................... 428/349 |
| 4,451,518 | 5/1984 | Miura et al. | ........................... 428/158 |
| 4,569,880 | 2/1986 | Nishiyama et al. | .................. 428/188 |
| 4,728,550 | 3/1988 | Van Beersel et al. | ............... 428/346 |
| 4,803,105 | 2/1989 | Kretow et al. | . |
| 4,803,108 | 2/1989 | Leuchten et al. | . |

FOREIGN PATENT DOCUMENTS

| | | | |
|---|---|---|---|
| 1211988 | 11/1970 | United Kingdom | ............... 428/34.9 |
| 1293456 | 10/1972 | United Kingdom | . |
| 2167319 | 5/1986 | United Kingdom | ............... 428/34.9 |

Primary Examiner—Patrick Ryan
Attorney, Agent, or Firm—Robert F. Kirchner

[57] ABSTRACT

The method of reinforcing a panel of sheet metal, a shaped plastic body or the like is performed by means of a one- or multi-layer stiffening member of essentially flat shape which comprises a layer at least partially consisting of a thermosetting resin. Thereby, the stiffening member is subjected to a first heat treatment until at least one of the surfaces of the stiffening member is sticky. Thereafter, the stiffening member is applied to the surface of an element to be reinforced. Finally, the stiffening member is subjected to a second, final heat treatment until all layers comprising a thermosetting resin material are cured. Thus, it is not necessary to manually prepare the stiffening member by removing a protection foil from its sticky surface prior to applying it to the element to be reinforced and a fully automated handling is possible.

46 Claims, 4 Drawing Sheets

METHOD OF REINFORCING SHEET METAL PANELS, SHAPED PLASTIC PANELS OR THE LIKE AND A STIFFENING MEMBER USABLE FOR PERFORMING THE METHOD

BACKGROUND OF THE INVENTION

The present invention refers to a method of reinforcing sheet metal panels, shaped plastic panels or the like, by means of an essentially flat stiffening member consisting of one or more layers, said stiffening member including at least one layer which consists at least partially of a thermosetting resin. Further, the invention refers to an essentially flat stiffening member having one or more layers usable to perform the method of the invention, said stiffening member including at least one layer which consists at least partially of a thermosetting resin.

According to the known prior art, multi-layer stiffening members may be used to reinforce a sheet metal panel, a shaped plastic panel or the like, e.g. a portion of a body of an automobile, which comprise a first, fibre-reinforced layer, e.g. a glass fibre tissue impregnated with a thermosetting resin material, this layer constituting the real stiffening layer. One surface thereof usually is coated with a second layer consisting of a further, thermosetting resin, said second layer serving as an adhesive layer.

A multi-layer stiffening member of this kind may be used to reinforce flat or curved panels like, for instance, sheet metal portions by placing a piece of the multi-layer stiffening member with its sticky resin surface onto the sheet metal portion to be reinforced and subsequently subjecting it to a heat treatment. Thereby, on the one side, an adhesion of the multi-layer stiffening member to the sheet metal portion is effected and, on the other side, the resin layers are cured such that a stiff connection between the sheet metal portion and the fibre reinforced layer results. In this way, an essential stiffening of the sheet metal portion may be achieved in a very simple manner without the disadvantage of substantially increasing the weight of the panel to be reinforced.

In order to make sure that the multi-layer stiffening member can easily be applied to the sheet metal portion to be reinforced, the adhesive resin layer usually has a sticky surface such that the applied multi-layer stiffening member adheres in the required position on the sheet metal portion until it is subjected to a heat treatment. However, one is forced to protect the sticky resin surface of the multi-layer stiffening member up to the moment when it is used in order to protect the sticky resin surface from contamination and, further, in order to enable a plurality of multi-layer stiffening members to be stacked. In the prior art, such protection is in the form of a suitably treated paper sheet or a protection foil which can be removed from the multi-layer stiffening member surface immediately prior to its application.

One of the most important disadvantages thereby is that the removal of the protection paper or the protection foil is an undesired additional operation step which hardly can be performed automatically. Particularly, in the field of automobile construction in which such multi-layer stiffening members are widely used and in which an important goal consists in the automation of as many operation steps as possible, this operation of removing the protection paper or the protection foil is considered as an undesired and time-consuming job which can be performed only by a human operator.

OBJECTS OF THE INVENTION

It is a primary object of the present invention to provide a method of reinforcing a panel and to improve a stiffening member of the kind referred to hereinabove such that the abovementioned disadvantages are avoided.

It is a further object of the invention to provide a method of reinforcing a panel formed of sheet metal, shaped plastic material, sheet moulding compound or the like which method is well suited for automation and can be performed e.g. by a robot, i.e. which does not require any manual handling of a reinforcing or stiffening member like removing a protection paper or foil prior to applying the reinforcing or stiffening member to the panel to be reinforced.

It is a still further object of the invention to provide a stiffening member which can be stacked without the danger that one stiffening member adheres on the next one, whereby an immediate application of the stiffening member to a sheet metal portion or the like is possible without the need to remove a protection paper or a protection foil.

SUMMARY OF THE INVENTION

To meet these and other objects, the invention provides a method of reinforcing sheet metal panels, shaped plastic panels or the like by means of an essentially flat stiffening member consisting of one or more layers, said stiffening member including at least one layer which consists at least partially of a thermosetting resin. The method of the invention includes the following steps:

(a) subjecting said stiffening member to a first heat treatment until at least one of its surfaces is sticky;

(b) applying said stiffening member with its sticky surface to an element to be reinforced; and (c) subjecting said stiffening member to a second heat treatment until all layers of said stiffening element which consist of a thermosetting resin are cured.

Thus, the stiffening member can be subjected to a superficial heat treatment prior to its application to the panel to be reinforced whereby a sticky surface constituting an adhesive layer is exposed or built-up. Consequently, the stiffening member adheres as usual on the portion of the panel to be reinforced. During the final heat treatment which is required to cure the thermosetting resins of the reinforcing or stiffening member a reliable bonding of the stiffening member to the surface of the panel to be reinforced is ensured.

The method of the invention can be performed automatically, e.g. by a robot without any difficulties since it is no longer necessary to remove a protection paper or foil from the adhesive layer of the stiffening member.

According to a further aspect, the invention provides an essentially flat stiffening member having one or more layers usable to perform the method of the invention. The stiffening member including at least one layer which consists at least partially of a thermosetting resin and comprises at least one heat reactive layer to render one surface of said stiffening member sticky as soon as the first heat treatment has been effected. It is understood that many possibilities exist to practically realize a stiffening member of the invention; some preferred embodiments thereof and will be further explained in the following description.

BRIEF DESCRIPTION OF THE DRAWINGS

In the following, some embodiments of the stiffening member useful for performing the method of the invention will be described in detail, with reference to the accompanying drawings. In the drawings.

DETAILED DESCRIPTION OF SOME PREFERRED EMBODIMENTS

As already briefly explained hereinabove, the basic idea of the method of the invention is to reinforce or stiffen a sheet metal panel, a plastic panel or the like by means of an essentially flat stiffening member without the need to remove a protection paper or foil prior to applying the stiffening member onto the element to be reinforced.

For this purpose, a stiffening member can be used as it is shown in different embodiments in the enclosed FIGS. 1 to 15 in a schematic manner. However, it is important that the stiffening member includes at least one layer which consists at least in part of a thermosetting resin and further, that it includes at least one heat reactive layer to render one surface of the stiffening member sticky. The thermosetting resin layer is required to ensure that the stiffening member will become rigid after the second heat treatment and, thus, can fulfill its reinforcing function.

The said thermosetting resin layer and the said heat reactive layer to create a sticky surface can be different separate layers, or these two functions can be performed by one and the same layer as will be further explained hereinafter.

Figure 1:
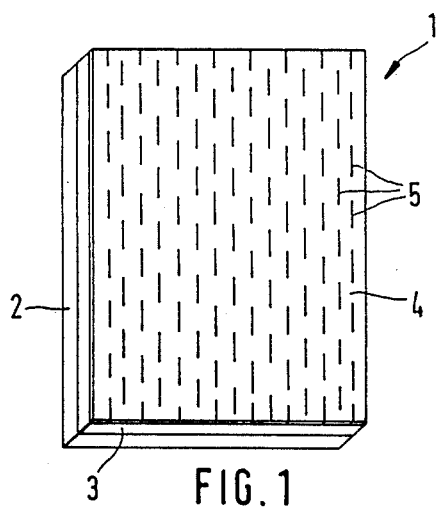
FIG. 1 shows a diagrammatic top view of a first embodiment of a stiffening member prior to the first, superficial heat treatment.
Figure 2:
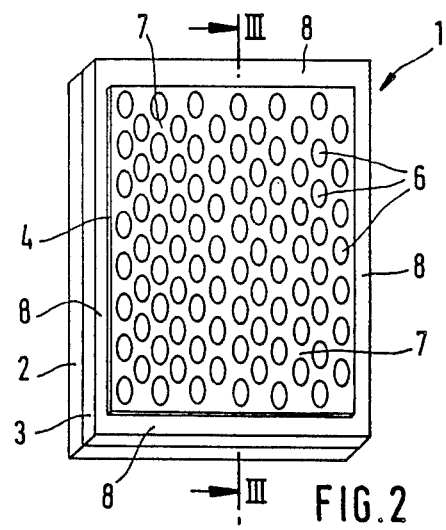
FIG. 2 shows a diagrammatic top view of the first embodiment after the first, superficial heat treatment.
Figure 3:
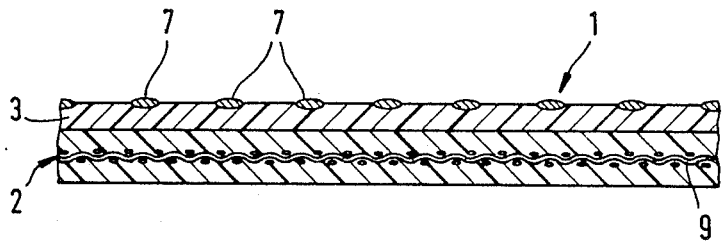
FIG. 3 shows a partial sectional view along the line III—III in FIG. 2 in a larger scale.
Figure 4:
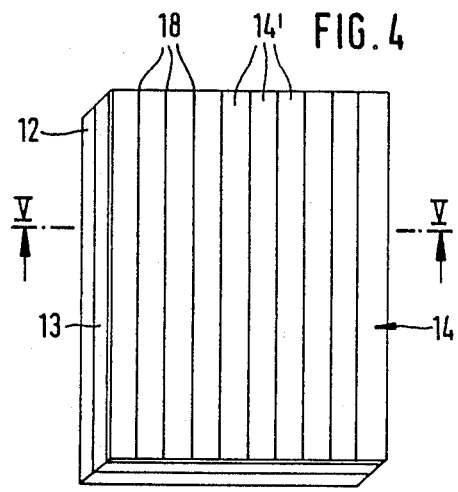
FIG. 4 shows a diagrammatic top view of a second embodiment of a stiffening member prior to the first, superficial heat treatment.

The first embodiment of a stiffening member, generally designated with reference numeral 1 and shown in FIGS. 1–3, comprises a reinforcing layer 2 which may consist, for instance, of a glass fibre tissue 9 impregnated with a thermosetting resin and provided on one of its surfaces with a layer 3 consisting of a thermosetting adhesive resin. As the surface of the adhesive layer 3 preferably is made sticky in order to enable the stiffening member to be easily applied to a sheet metal portion to be reinforced without the need for further connecting means, a cover foil 4 is provided protecting the surface of the sticky adhesive resin from contamination and enabling pieces of stiffening members 1 cut into a desired size to be stacked without the danger that they adhere to each other.

The adhesive layer 3 can be integrally self-adhesive or sticky, or it can be provided with an adhesive or sticky layer on its exposed surface, depending on the application and the materials best suited for a specific application.

In order to avoid the need to remove the protection foil 4 prior to applying the stiffening member to the sheet metal portion to be reinforced, the foil is made of a material which shrinks upon heating. Such materials are known in the art and are marketed in a plurality of different embodiments.

According to a first embodiment of the invention shown in FIGS. 1 to 3, the foil 4 is made of one piece and comprises a plurality of slits 5 which are arranged in rows extending parallel to each other and which are offset to each other in adjacent rows. Initially, in the state as shown in FIG. 1, the slits 5 do not have any effect as they are closed; thus, the same protection of the sticky surface of the adhesive layer 3 is achieved as with a continuous foil without slits.

If it is desired to apply the stiffening member 1 onto a sheet metal portion to be reinforced, the stiffening member 1 has to be subjected to a superficial heat treatment during a short period. Such heat treatment can be realized by means of a flame at the foil side or by passing the stiffening member with its foil side along an infrared heater. Thereby, the foil 4 shrinks and changes its shape to a net-like structure whereby the slits 5 open to oval apertures 6 (FIG. 2). Thus, a major part of the sticky surface of the adhesive layer 3 is freely exposed so that the stiffening member 1 can be fastened to the portion of the panel to be reinforced as usual by simply placing it thereon or by slightly pressing it onto the panel, e.g. onto the sheet metal portion to be reinforced.

Additionally, the foil 4 shrinks as a whole such that edge portions 8 running along the edges of the adhesive resin layer 3 are completely laid open. This additional effect is highly desired since thereby the adhering of the body member 1 on the portion of the panel to be reinforced, prior to the final heat treatment, is much more pronounced. Thus, an improved protection against corrosion is achieved in the edge portions 8 because no underwashing, resulting eventually in a partial loosening of the body member 1, can result since the adhesive layer adheres on the panel to be reinforced with its entire edge surfaces 8. Such underwashing effects can occur if the body member 1 is e.g. connected to the inner surface of a car body which subsequently is washed and/or subjected to a priming operation before the final heat treatment is performed.

During the final heat treatment, the thermosetting resin in the adhesive layer 3 will become more viscous and flows around the remaining lands 7 of the shrinked protection foil 4 (FIG. 3), with the consequence that essentially the entire surface of the sticky resin layer 3 can be used for the connection of the stiffening member 1 to a sheet metal portion or similar panel to be reinforced.

Figure 6:
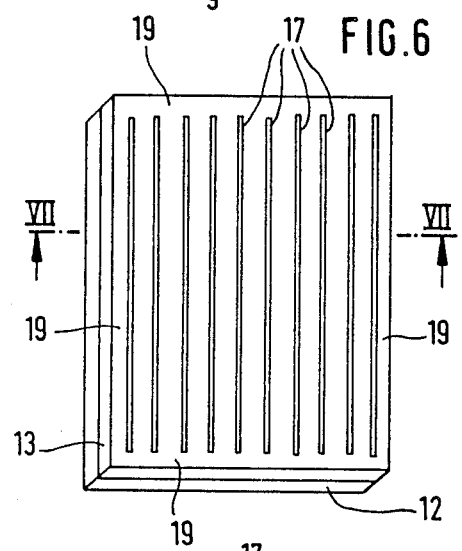
FIG. 6 shows a diagrammatic top view of the second embodiment after the first, superficial heat treatment.
Figure 5:
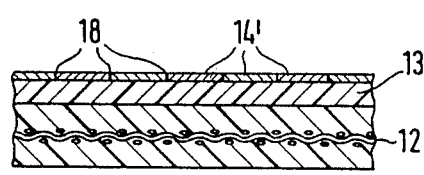
FIG. 5 shows a partial sectional view along the line V—V in FIG. 4 in a larger scale.
Figure 7:
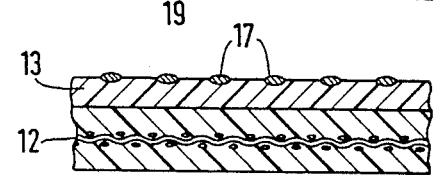
FIG. 7 shows a partial sectional view along the line VII—VII in FIG. 6 in a larger scale.

The stiffening member 11 according to a second embodiment shown in FIGS. 4–7 is of similar design and comprises for instance a glass fibre tissue 12 impregnated with a thermosetting resin and provided with a layer 13 consisting of a sticky adhesive thermosetting resin. The protection foil 14, again consisting of a material shrinking under the influence of heat, however, is built up by a plurality of single webs 14' arranged adjacent to each other and thereby providing the protection effect of a continuous foil (FIGS. 4 and 5), since the single webs 14' are separated from each other only by very narrow slits 18. After the heat treatment, the webs 14' shrink into the shape of narrow lands 17; consequently, essentially the entire surface of the sticky adhesive resin layer 13 is freely exposed again in order to enable the stiffening member 11 to be fastened to a panel, e.g. a sheet metal portion to be reinforced by simply pressing on (FIGS. 6 and 7).

In this case again, the effect is observed that the foil 14 additionally shrinks as a whole, particularly in the length dimension of the remaining lands 17, such that edge portions 19 of the sticky surface of the adhesive resin layer 13 are completely laid open; the result are the advantages which have been explained in connection with the previous embodiment.

In the two embodiments discussed hereinabove, the heat reactive layer required according to the invention is constituted by the combination of the resin layer 3 and 13, respectively, and the heat shrinking foil 4 and 14, respectively. In fact, the resin layer 3 and 13, respectively, is sticky per se whereby the activation, i.e. the exposing of the sticky surface, is performed by the first heat treatment whereby the foil 4 and 14, respectively, shrinks.

Figure 8:
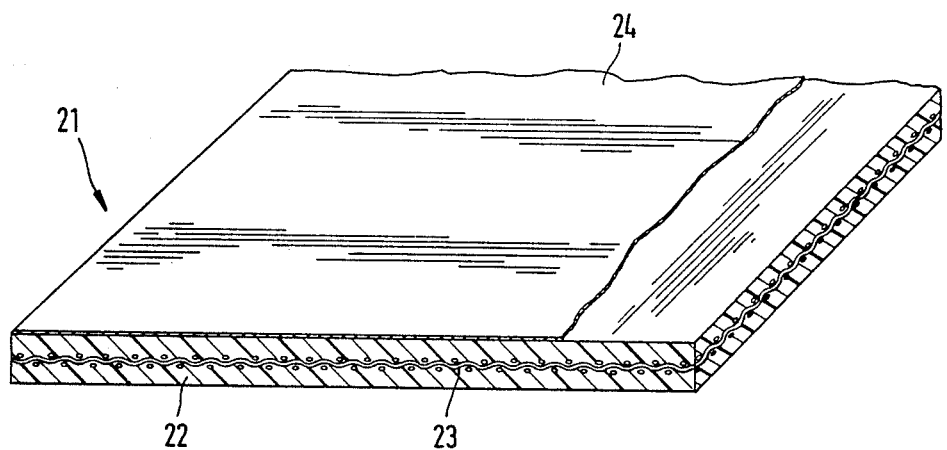
FIG. 8 shows a partially sectioned partial view of a third embodiment of the stiffening member.
Figure 9:
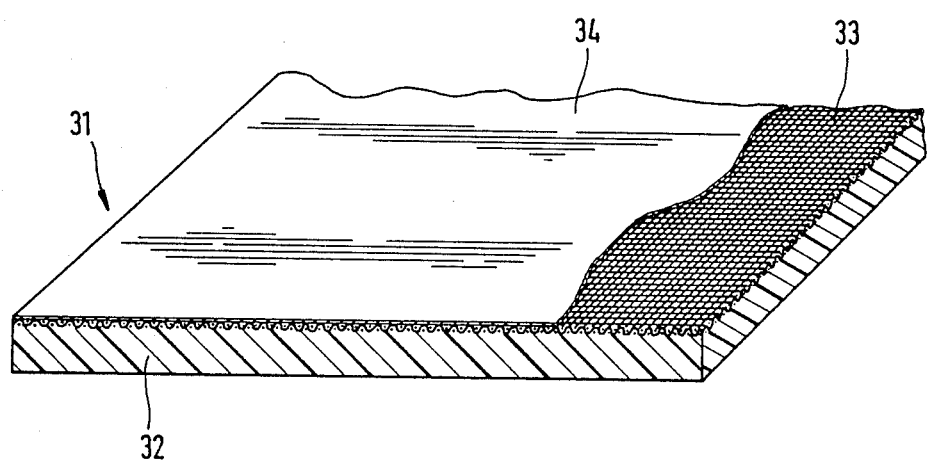
FIG. 9 shows a partially sectioned partial view of a fourth embodiment of the stiffening member.

According to FIGS. 8 and 9, there are shown further embodiments of the stiffening member in a partially sectioned partial view. In FIG. 8, the stiffening member is generally designated with reference numeral 21, and in FIG. 9, the stiffening member is generally designated with reference numeral 31. In the example shown in these Figures, the stiffening members 21 and 31, respectively, essentially consist of a single layer, i.e. a layer 22 and 32, respectively, made of a reactive hot-melt adhesive material comprising reinforcing means.

As a reactive hot-melt adhesive material, an adhesive resin on the basis of an epoxy resin, eventually on the basis of a polyurethane or of a copolyester may be used. As an example, a one-component-mixture including epoxy resins based on Bisphenol-A and a heat reactive curing agent, e.g. dicyanamide, has proven useful. Such hot-melt adhesive materials are dry at room temperature and get sticky as soon as they are heated to a temperature of appr. 60° C. The melting region can be adjusted by appropriately selecting the solid resin components and by adding liquid additives like liquid epoxides, tackifier resins, plasticizers and similar components.

According to the method of the present invention, during the first heat treatment, the hot-melt adhesive layer 22 and 32, respectively, is heated to a temperature of appr. 60° to 140° C., preferably to a temperature of appr. 80° to 120° C. Thus, it is ensured that the surface of the stiffening member 21 and 31, respectively, becomes sticky enough and has a sufficient heat capacity to securely adhere on a sheet metal panel even if the latter one has only room temperature. It was observed that the stiffening member 21 and 31, respectively, remains adhered on the sheet metal panel even if the stiffening member cools down to room temperature again.

During the second heat treatment, the stiffening member 21 and 31, respectively, is heated to a temperature of appr. 140° to 240° C., preferably to a temperature of appr. 160° to 200° C. This temperature is kept for a sufficient period of time to enable the resin material to cure with the result that the hot-melt adhesive layer 22 and 32, respectively, is hardened.

As already briefly mentioned, the layer 2 and 12, respectively in the case of the first and second embodiments, and the layer 22 and 32, respectively, in the case of the third and fourth embodiments, are provided with reinforcing means. For this purpose, the following measures can be taken singly or in combination:

1. Inorganic fillers like e.g. talcum, chalk, mica, wollastonite or the like can be admixed to the resin material in order to improve the mechanical properties of the cured resin layer.

2. As shown in FIGS. 3, 5, 7 and 8, an essentially flat reinforcing body member 9 and 23, respectively, can be embedded in the resin layer 2, 12 and 22, respectively. The reinforcing body member can be a mat, a tissue, a netting, a fleece or the like. Preferably, it consists of glass fibres, carbon fibres, aramide fibres or similar fibres. This measure contributes much to an improvement of the physical and mechanical strength of the cured resin layer.

3. As shown in FIG. 9, an essentially flat reinforcing body member 33 can be placed onto the resin layer 32. If desired, the body member 33 can be pressed onto or into the surface of the resin layer 32. The reinforcing body member 33 can be a mat, a tissue, a netting, a fleece or the like. Preferably, it consists of glass fibres, carbon fibres, aramide fibres, jute fibres, ramie fibres or similar fibres. This measure contributes much to an improvement of the physical and mechanical strength of the cured resin layer as well.

In order to protect the surface of the stiffening member 21 and 31, respectively, which is remote from the element to be reinforced, said surface can be covered by a protection foil 24 and 34, respectively. Preferably, the protection foil is made of aluminium, paper or polyester.

Figure 10:
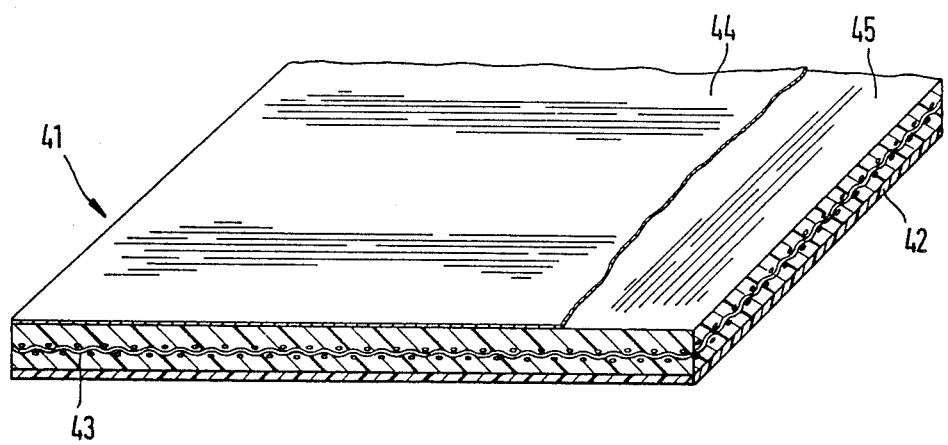
FIG. 10 shows a partially sectioned partial view of a fifth embodiment of the stiffening member.
Figure 11:
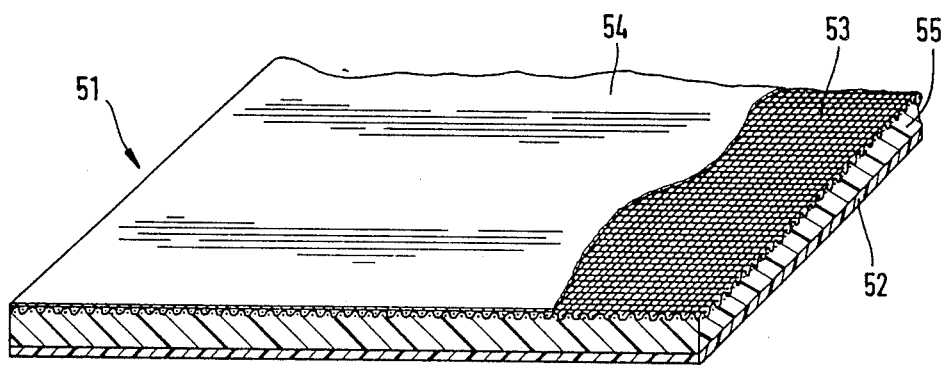
FIG. 11 shows a partially sectioned partial view of a sixth embodiment of the stiffening member.

Further embodiments of a stiffening member 41 and 51, respectively, are shown in FIGS. 10 and 11 in a view corresponding to the view of FIGS. 8 and 9. Essentially, the difference of the embodiments shown in FIGS. 10 and 11 with regard to the embodiments shown in FIGS. 8 and 9 consists in the fact that the stiffening members 41 and 51, respectively, consist of two layers: On the one hand, there is provided a layer 45 consisting of a thermosetting resin including reinforcing means, and on the other hand, there is provided a layer 42 consisting of a reactive hot-melt adhesive material as shown in FIG. 10. Correspondingly, the stiffening member 51 according to FIG. 11 comprises a layer 55 consisting of a thermosetting resin provided with reinforcing means and a layer 52 consisting of a reactive hot-melt adhesive material. The layers 42 and 52, respectively, can be made of the same reactive hot-melt adhesive material as explained in connection with the embodiments according to FIGS. 8 and 9. The material used for the layer 45 and 55, respectively, is a thermosetting one-component-mixture on the basis of epoxy resins which, if appropriate, can be already prepolymerized.

Figure 12:
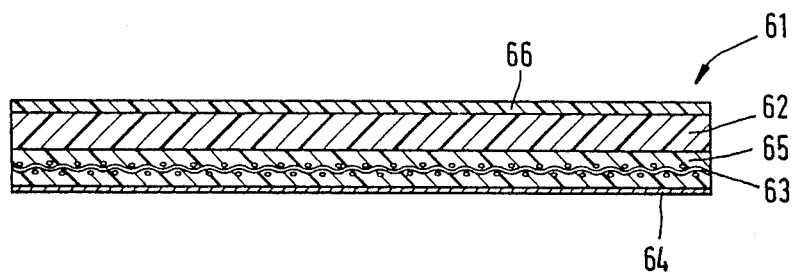
FIG. 12 shows a sectional view of a seventh embodiment of the stiffening member, prior to applying it to a sheet metal panel to be reinforced.

It is true that the embodiments according to FIGS. 8 and 9 are easier to manufacture, but the main advantage of the embodiments according to FIGS. 11 and 12 lies in the fact that they are less expensive since considerably less of the relatively expensive reactive hot-melt adhesive material is used. Furthermore, basically an improved reinforcement can be achieved because the optimally suited materials can be used for the real stiffening layer and the reinforcing means. Particularly, a resin may be used for the real stiffening layer having a relatively high content of fillers, while a resin having a relatively low content of fillers is used for the reactive hot-melt adhesive layer in order not to impair the elasticity of the adhesive layer.

As far as the reinforcing means are concerned, the same is true as explained hereinabove under paragraphs 1. to 3. In the case of the embodiment shown in FIG. 10, an essentially flat reinforcing body 43 is embedded in the resin layer 45. In the case of the embodiment shown in FIG. 11, an essentially flat reinforcing body 53 is placed on the surface of the resin layer 55 which is remote from the reactive hot-melt adhesive layer 52; if desired, the reinforcing body 53 can be pressed into the surface of the resin layer 55.

The layer 45 can also be manufactured by impregnating the flat reinforcing body 43 with a low viscous thermosetting epoxy resin. Thereby, the reinforcing body 43 which may be a glass fibre tissue is dipped into a solution of a resin mixture having a filler content of appr. 30 to 70%, then squeezed out and dried. After the drying operation, a prepolymerization can be effected, if desired.

According to the embodiments shown in FIGS. 8 and 9, the free surface of the stiffening member 41 and 51, respectively, can be covered with a protection foil 44 and 54, respectively, made of aluminium, paper or polyester.

Another possibility to realize the embodiments shown in FIGS. 10 and 11 is as follows: Instead of using a reactive hot-melt adhesive material for the layers 42 and 52, respectively, a thermoplastic hot-melt adhesive material can be provided, preferably on the basis of modified polypropylene, modified polyethylene, copolyamide or copolyester. Particularly useful are, for example, polypropylene polymers grafted with polar groups like maleic anhydride, acrylic acids, esters of acrylic acid and the like. These materials have a melting region of appr. 130° to 150° C., a heat resistance of appr. 130° 190° C., depending on the load exerted thereto, and an application temperature of appr. 170° to 250° C.

In this case, the thermoplastic hot-melt adhesive layer is heated, during the first heat treatment, to a temperature of appr. 170° to 250° C., but only for a short period of time. Because of the short duration of the heat treatment, the resin layer 45 and 44, respectively, does not yet react. The advantage of such a high application temperature is that the stiffening member 41 and 51, respectively, adheres better to sheet metal panels the surface thereof comprising traces of oil since the oil diffuses into the hot-melt adhesive layer 42 and 52, respectively, due to its high temperature. The layer 42 and 52, respectively, of thermoplastic hot-melt adhesive material can also be constituted by a polyamide copolymer or a polyester copolymer; both these substances have similar properties as the polypropylene polymer mentioned hereinabove.

In all cases, the thermoplastic hot-melt adhesive layer 42 and 52, respectively, is preferably in the shape of a foil having a thickness of between 0.1 to 2 mm, preferably between 0.2 and 0.6 mm, the layer 45 and 55, respectively, consisting of a thermosetting resin being fixed thereto.

Figure 13:
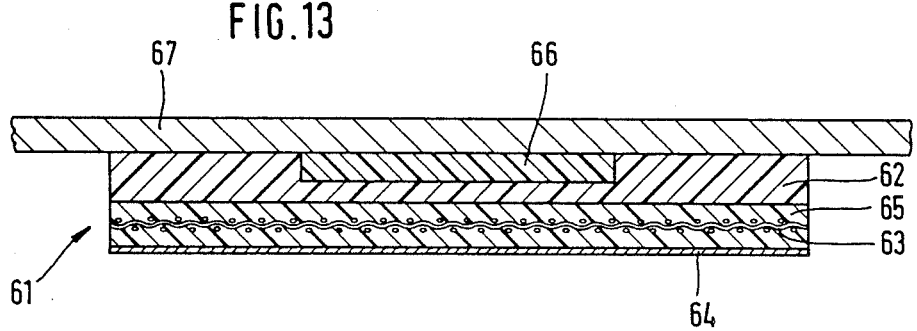
FIG. 13 shows a sectional view of the seventh embodiment of the stiffening member, after having been applied to a sheet metal panel to be reinforced and after the second heat treatment.

A further embodiment is shown in schematic sectional views in FIGS. 12 and 13. Again, the stiffening member generally designated with reference numeral 61 is constituted of more than one layer and comprises a layer 65 consisting of a thermosetting resin 65 including reinforcing means 63. Preferably, the same materials are used for the thermosetting resin layer 65 as explained hereinabove in connection with the embodiments according to FIGS. 10 and 11. The same is true for the reinforcing member 63 as well as for the fillers. Again, the free surface of the the resin layer 65 can be covered, if desired, by a protection foil 64 consisting of aluminium, paper or polyester. The other surface of the resin layer 65 is covered by an adhesive layer 62, preferably a layer consisting of a reactive hot-melt adhesive material, the specifications thereof having been described in connection with the embodiments according to FIGS. 8 and 9. However, the melting point of the adhesive layer 62 according to the embodiment of FIGS. 12 and 13 is considerably lower and this lower melting point can be achieved by suitably composing the material of the reactive hot-melt adhesive layer. In the embodiment according to FIGS. 12 and 13, the melting point of the material used for the reactive hot-melt adhesive layer 62 is in the region of 10° to 40° C., preferably 15° to 25° C., such that the layer 62 is already sticky at room temperature or at slightly elevated temperature.

Finally, the layer 62 is covered by a thermoplastic hot-melt adhesive foil 66 which shrinks as soon as it is subjected to an elevated temperature. At room temperature, however, the foil 66 is dry, i.e. not sticky. The material used for the foil 66 preferably is selected from the group consisting of: Modified polyethylenes, modified polypropylenes, copolyamides, copolyesters and ethylene vinyl acetate. Even more preferably, there may be used a polyethylene grafted with acrylic acid or with esters of acrylic acid, or polyethylene copolymerized with acrylic acid or esters of acrylic acid.

As can be seen from FIG. 13, the foil 66 shrinks after the first heat treatment and exposes a considerable part of the surface of the layer 62. Upon pressing the stiffening member 61 onto a sheet metal panel 67 to be reinforced, the shrinked foil 66 is embedded in the layer 62.

Figure 14:
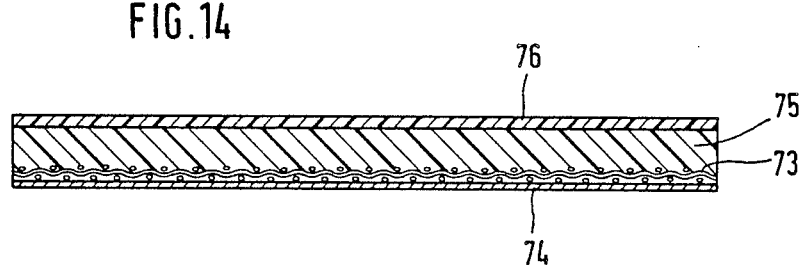
FIG. 14 shows a sectional view of an eighth embodiment of the stiffening member, prior to applying it to a sheet metal panel to be reinforced.
Figure 15:
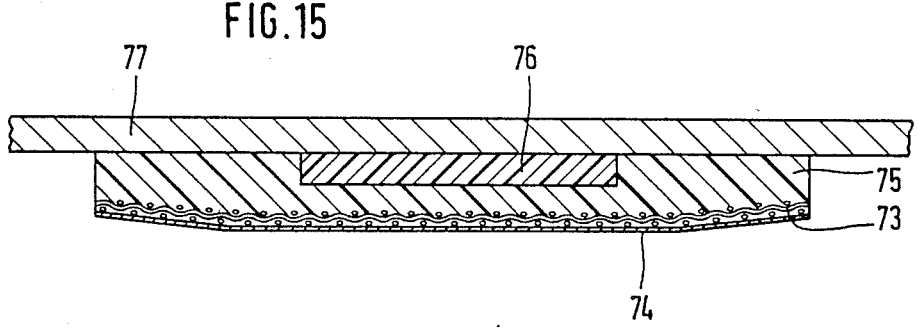
FIG. 15 shows a sectional view of the eighth embodiment of the stiffening member, after having been applied to a sheet metal panel to be reinforced and after the second heat treatment.

An embodiment similar to the one explained with regard to FIGS. 13 and 14 hereinabove is shown in FIGS. 14 and 15, incorporating a stiffening member 71. However, in this embodiment, the hot-melt adhesive layer 62 is omitted and the shrinking foil 76 is attached directly to the surface of the thermosetting resin layer 75. However, in this embodiment, the composition of the material of the thermosetting resin layer 75 is different; the composition is adjusted such that the melting point of the resin material is relatively low in order to achieve that the surface of the resin layer 75 is sticky already at temperatures in the region of appr. 10° to 40° C., preferably in the region of appr. 15° to 25° C.

Preferably, the reinforcing body 73 is placed on or pressed into the surface of the layer 75 which is remote from the surface of the layer 75 provided with the heat shrinking foil 76, and further covered on its other surface by a protection foil 74 made of aluminium, paper or polyester.

According to FIG. 15, the stiffening member 71 is placed onto the surface of the sheet metal panel 77 to be reinforced. The first heat treatment has already been effected with the result that the foil 76 is shrunken and lays open a considerable part of the surface of the sticky thermosetting resin layer 75. Similar to the embodiment according to FIGS. 12 and 13 and as explained with reference thereto, the shrunken foil 76 is embedded in the thermosetting resin layer 75.

In a similar manner as described in connection with the embodiment according to FIGS. 1 to 3, the foil 66 and 76, respectively, can be provided with a plurality of slits as well. A further advantage lies in the fact that the foil 66 and 76, respectively, itself acts as an adhesive as the foil consists, as mentioned hereinabove, of a thermoplastic hot-melt adhesive material. Thus, it is not imperative that the remaining lands of the shrunken slitted foil be embedded completely in the material of the layer 62 or in the resin layer 76 once the stiffening member is applied to the element to be reinforced.

In all cases described hereinbefore it is ensured that the surface of the stiffening member which is intended, in a later stage of the method, to adhere on the surface of the element to be reinforced is dry prior to the first heat treatment, particularly is not sticky. This situation is changed after the first heat treatment and the surface gets sticky in order to enable the stiffening member to adhere on the surface of the element to be reinforced until the second heat treatment is effected. The first heat treatment can be performed, e.g., by means of a infrared ray emitting member along which the stiffening member is passed by. Another possibility consists in treating the surface of the stiffening member which will come into contact with the element to be reinforced by means of flames.

Depending on the material of the surface which will come into contact with the surface of the element to be reinforced and has to adhere thereon, the first heat treatment can be performed at a lower temperature than the second heat treatment, particularly to avoid that the real stiffening layer consisting of a thermosetting resin composition already starts to cure. However, in the case of the embodiment in which the contacting layer consists of a thermoplastic hot-melt adhesive material, it may be advantageous to effect the first heat treatment at the same temperature as the second heat treatment or even at a higher temperature. In this case, however, care must be taken to effect the first heat treatment only during a relatively short period of time which does not allow the thermosetting resin layer already to start its curing reaction.

Usually, the second heat treatment will take a considerable longer time than the first heat treatment. As an example, the following situation shall be explained:

For simplicity, it is advisable to perform the second heat treatment in an oven, particularly in a stove furnace used or stove-enamelling a paint layer sprayed onto an element. Certain panel portions of such an element have to be reinforced. The structure of the element having been finished, the required number of stiffening members are subjected to the first heat treatment and then applied to the portions of the element to be reinforced whereon they securely adhere. Thereafter, the element can be subjected to a priming operation, if required, and then provided with e.g. a paint finish. The stiffening members still adhere on the selected portions of the elements. Finally, the element is displaced into a stove furnace where, on the one hand, the paint layer is stove-enamelled and, on the other hand, the materials of the stiffening members cure.

A usual stove furnace operates at a temperature of appr. 170° to 190° C. and the time required for stove-enamelling is appr. 30 minutes. A thermosetting resin material usable in connection with the stiffening member of the invention can be adjusted such that a heat treatment at 180° C. during appr. 30 minutes is sufficient to completely cure the resinous material. Thus, it is not necessary to provide a separate operation step to perform the second heat treatment and thereby to effect curing of the stiffening member.

What we claim is:

1. An essentially flat stiffening member for the reinforcement of a panel, comprising a first layer containing a thermosetting resin provided with reinforcing means, and a second layer containing a sticky thermosetting resin, said second layer being covered by a foil shrinking under the influence of heat and essentially freely exposing said second layer upon shrinking to render one surface of said stiffening member sticky upon having been subjected to a heat treatment.

2. A stiffening member according to claim 1, in which said foil is made of one piece and comprises a plurality of slits.

3. A stiffening member according to claim 2, in which said slits are arranged in rows extending parallel to each other as well as offset to each other in adjacent rows.

4. A stiffening member according to claim 1, in which said foil comprises a plurality of small webs extending parallel to each other and arranged side by side.

5. A stiffening member according to claim 1 in which said first layer comprises an essentially flat reinforcing member which is soaked or impregnated with a thermosetting resin material.

6. A stiffening member according to claims 5, in which said thermosetting resin material is a one-component mixture of epoxy resin which can be partially prepolymerized.

7. A stiffening member according to claim 1, in which said reinforcing means includes fillers and/or mats, tissues, nettings, or fleeces.

8. A stiffening member according to claim 7, in which the fillers are selected from the group consisting of talcum, chalk, mica, wollastonite, glass fibres, carbon fibres, aramide fibres, jute fibres and ramie fibres, either singly or in any combination.

9. A stiffening member according to claim 7, in which said mats, tissues, nettings, or fleeces, respectively, are made of glass, aramide, carbon, jute or ramie.

10. A stiffening member according to claim 1, in which said reinforcing means include mats, tissues, nettings, or fleeces, made of glass, aramide, carbon, jute or ramie, placed on and/or pressed into the surface of said first layer which is remote from the element to be reinforced.

11. A stiffening member according to claim 1, in which said reinforcing means include mats, tissues, nettings, or fleeces, made of glass, aramide, carbon, jute or ramie, embedded in said first layer which is remote from the element to be reinforced.

12. A stiffening member according to claim 1, in which the surface of the stiffening member remote from the element to be reinforced is covered by a protection foil.

13. A stiffening element according to claim 12, in which said protection foil consists of aluminium, paper or polyester.

14. An essentially flat stiffening member for the reinforcement of a panel, comprising a first layer containing a thermosetting resin and a second layer of a reactive hot-melt adhesive material provided with reinforcing means and adapted to render one surface of said stiffening member sticky upon having been subjected to a heat treatment, said hot-melt adhesive material having a thickness of between 0.1 and 2 mm.

15. A stiffening member according to claim 14, in which said reactive hot-melt adhesive material is a resinous adhesive material based on an epoxy, a polyurethane or a copolyester.

16. A stiffening member according to claim 14, in which said reinforcing means include fillers and/or mats, tissues, nettings, or fleeces.

17. A stiffening member according to claim 16, in which the fillers are selected from the group consisting of talcum, chalk, mica, wollastonite, glass fibres, carbon fibres, aramide fibres, jute fibres and ramie fibres, either singly or in any combination.

18. A stiffening member according to claim 16, in which said mats, tissues, nettings, or fleeces, respectively, are made of glass, aramide, carbon, jute or ramie.

19. A stiffening member according to claim 14, in which said reinforcing means include mats, tissues, nettings, or fleeces, made of glass, aramide, carbon, jute or ramie, placed on and/or pressed into the surface of said reactive hot-melt adhesive layer which is remote from the element to be reinforced.

20. A stiffening member according to claim 14, in which said reinforcing means include mats, tissues, nettings, or fleeces, made of glass, aramide, carbon, jute or ramie, embedded in said reactive hot-melt adhesive layer.

21. A stiffening member according to claim 14, in which the surface of the stiffening member remote from the element to be reinforced is covered by a protection foil.

22. A stiffening element according to claim 21, in which said protection foil comprises aluminum, paper or polyester.

23. An essentially flat stiffening member for the reinforcement of a panel, comprising a first layer having a thermosetting resin provided with reinforcing means, and a second layer having a reactive hot-melt adhesive material adapted to render one surface of said stiffening member sticky upon having been subjected to a heat treatment, said hot-melt adhesive material having a thickness of between 0.1 and 2 mm.

24. A stiffening member according to claim 23, in which said reactive hot-melt adhesive material is a resinous adhesive material based on an epoxy, a polyurethane or a copolyester.

25. A stiffening member according to claim 23, in which said first layer comprises an essentially flat reinforcing member which is soaked or impregnated with a thermosetting resin material.

26. A stiffening member according to claim 23, in which said thermosetting resin material is a one-component mixture of epoxy resin which can be partially prepolymerized.

27. A stiffening member according to claim 23, in which said reinforcing means include fillers and/or mats, tissues, nettings, or fleeces.

28. A stiffening member according to claim 27, in which the fillers are selected from the group consisting of talcum, chalk, mica, wollastonite, glass fibres, carbon fibres, aramide fibres, jute fibres and ramie fibres, either singly or in any combination.

29. A stiffening member according to claim 27, in which said mats, tissues, nettings, or fleeces, respectively, are made of glass, aramide, carbon, jute or ramie.

30. A stiffening member according to claim 23, in which said reinforcing means include mats, tissues, nettings, or fleeces, made of glass, aramide, carbon, jute or ramie, placed on and/or pressed into the surface of said first layer which is remote from the element to be reinforced.

31. A stiffening member according to claim 23, in which said reinforcing means include mats, tissues, nettings, or fleeces, made of glass, aramide, carbon, jute or ramie, embedded in said first layer.

32. A stiffening member according to claim 23, in which the surface of the stiffening member remote from the element to be reinforced is covered by a protection foil.

33. A stiffening element according to claim 32, in which said protection foil comprises aluminium, paper or polyester.

34. An essentially flat stiffening member for the reinforcement of a panel, comprising a first layer having a thermosetting resin provided with reinforcing means, and a second layer having a thermoplastic hot-melt adhesive material adapted to render one surface of said stiffening member sticky upon having been subjected to a heat treatment, said hot-melt adhesive material having a thickness of between 0.1 and 2 mm.

35. A stiffening member according to claim 34, in which said first layer comprises an essentially flat reinforcing member which is soaked or impregnated with a thermosetting resin material.

36. A stiffening member according to claim 34, in which said thermosetting resin is a one-component mixture of epoxy resin which can be partially prepolymerized.

37. A stiffening member according to claim 34, in which said thermoplastic hot-melt adhesive material is a modified polypropylene, a modified polyethylene, a copolyamide or a copolyester.

38. A stiffening member according to claim 34, in which said layer having a thermoplastic hot-melt adhesive material comprises a foil connected to said thermosetting resin layer.

39. A stiffening member according to claim 38, in which said foil is made of a material shrinking under the influence of heat and which foil may be provided with a plurality of slits.

40. A stiffening member according to claim 34, in which said reinforcing means include fillers and/or mats, tissues, nettings, or fleeces.

41. A stiffening member according to claim 40, in which the fillers are selected from the group consisting of talcum, chalk, mica, wollastonite, glass fibres, carbon fibres, aramide fibres, jute fibres and ramie fibres, either singly or in any combination.

42. A stiffening member according to claim 40, in which said mats, tissues, nettings, or fleeces, respectively, are made of glass, aramide, carbon, jute or ramie.

43. A stiffening member according to claim 34, in which said reinforcing means include mats, tissues, nettings, or fleeces, made of glass, aramide, carbon, jute or ramie, placed on and/or pressed into the surface of said first layer member which is remote from the element to be reinforced.

44. A stiffening member according to claim 34, in which said reinforcing means include mats, tissues, nettings, or fleeces, made of glass, aramide, carbon, jute or ramie, embedded in said first layer.

45. A stiffening member according to claim 34, in which the surface of the stiffening member remote from the element to be reinforced is covered by a protection foil.

46. A stiffening element according to claim 45, in which said protection foil comprises aluminium, paper or polyester.

* * * * *